June 29, 1937.                    J. BILL                    2,084,985
                            SCREW LOCKING DEVICE
                             Filed Feb. 4, 1935
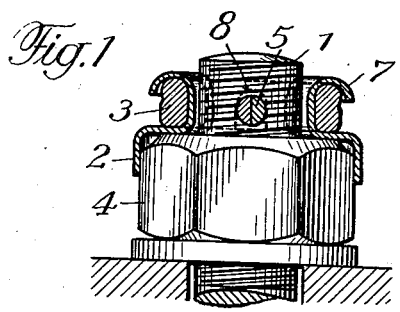
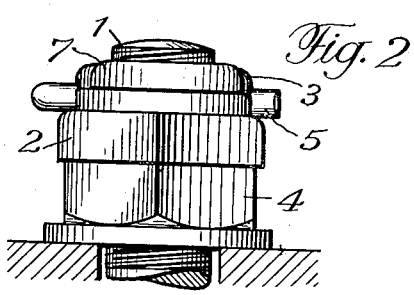
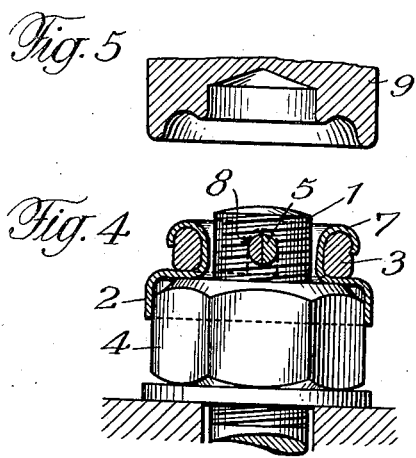
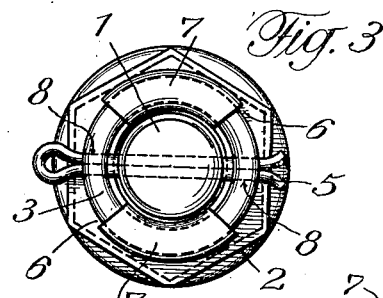
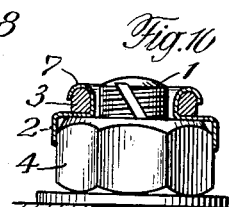
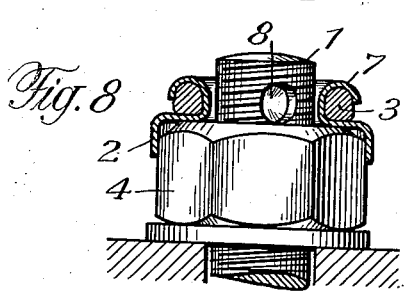
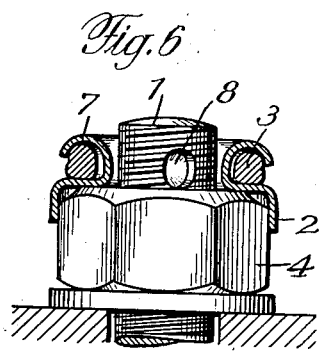
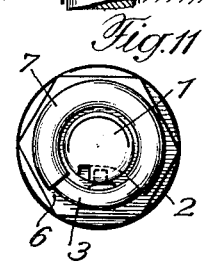
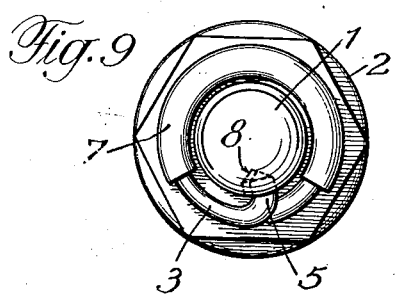
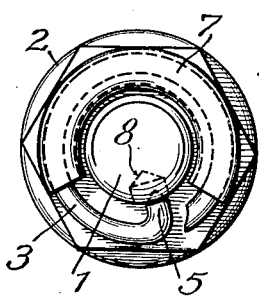
Inventor:
Jean Bill
By Sommers & Young
Attys.

Patented June 29, 1937

2,084,985

UNITED STATES PATENT OFFICE 2,084,985

SCREW LOCKING DEVICE

Jean Bill, Zurich, Switzerland

Application February 4, 1935, Serial No. 4,912
In Germany February 13, 1934

8 Claims. (Cl. 151—29)

This invention relates to screw locking devices comprising a cap overlapping a nut on the screw to prevent relative rotation between the cap and the nut, and a locking means interengaging with the screw shank.

In distinction from the hitherto known devices of this kind, according to this invention, in the device at least one arcuate member is provided which is pushed in a rotationally displaceable manner on a neck of the cap, at least one aperture being provided in said neck for giving the locking means access to the screw shank for engagement therewith and thus to lock the arcuate member to said shank, the neck in turn overlapping the arcuate member for securing the latter to the cap by a corresponding portion of said neck being forced into engagement with the arcuate member.

In contradistinction from the usual locking devices, the device according to this invention can be mounted in locking position on the nut in every angular adjustment of the latter, which is of particular advantage, when a certain tension is to be maintained in the screw shank, which is of eminent importance, for example, in the construction of air craft, motor vehicles and the like. Provided that the locking device according to the invention is properly mounted in position on the bolt, the latter is lastingly safely locked in such a way that the cap instead of being fastened to the screw shank directly is secured on the bolt indirectly through the intermediary of the arcuate member arranged on the neck of the cap.

In the accompanying drawing several constructional forms of the invention are illustrated by way of example only, in which Fig. 1 shows a sectional elevation of a first example of the device;

Fig. 2 shows an elevation as seen from the left in Fig. 1;

Fig. 3 is a top plan view of Fig. 2;

Fig. 4 shows the device in a different condition from that of Fig. 1;

Fig. 5 depicts an auxiliary implement;

Fig. 6 shows a sectional elevation of a second example;

Fig. 7 is a top plan view of Fig. 6;

Fig. 8 shows a different condition of the device as compared to Fig. 6;

Fig. 9 is a top plan view of Fig. 8;

Figs. 10 and 11 illustrate in a sectional elevation and in a top plan view respectively a third example.

In the first example of the device as per the Figs. 1 to 4, the numeral 1 designates the shank of a bolt on which a hexagon nut 4 is definitely screwed into position of adjustment, a cap 2 being set on the nut 4 to overlap the same by means of a hexagonal socket thereby to prevent relative rotation between these two parts. The cap 2 is provided with a neck 7 having two apertures 6, an arcuate member in the form of a ring 3 being pushed on this neck which before receiving the ring is straight, whereupon the ends of two opposed connection flaps formed on the neck by the apertures 6 are bent outwards over the ring, so as to provide a loose engagement between the ring and the cap. By 5 a locking means in the form of a cotter pin is designated which within the apertures 6 of the cap 2 is passed through openings 8 of the ring 3 and through a cross bore of the shank 1 of the bolt.

In order to produce a locking effect of the device, the cap 2 is appropriately mounted on the tightened screw nut 4 in a condition, as shown in Fig. 1, that is, with the ring 3 pushed thereon and the flaps of the neck 7 bent over the ring. In pushing the cap 2 on the hexagonal surface of the nut 4, the angular position of the former on the latter is so selected that the cross bore of the shank 1, representing the complementary locking means of the latter to the cotter pin 5 registers with the apertures 6 in the circumferentially discontinuous neck 7. The ring can then still be turned relative to the cap 2 and is so angularly adjusted that the openings 8 coincide with the cross-bore of the screw shank 1. Afterwards the cotter pin 5 is introduced through one of the apertures 6 into the openings 8 and the cross-bore of the ring 3, so that the latter is locked to the bolt 1. Finally the two flaps of the neck of the cap 2 are pressed onto the outer side of the ring 3 at their outer ends by applying a die 9 to the latter and striking the die with a hammer. In this way the device is put in the condition shown in Fig. 4 wherein a firm clamping engagement is provided between the ring 3 and the cap 2 and consequently these two parts are locked to each other.

If it should be required to unlock the device and to lock it again after the nut has been tightened again, the exterior edges of the two flaps of the neck 7 of the cap are bent outwards by means of a suitable wrench or the like. On the subsequent extraction of the cotter pin 5 it is possible to turn the ring 3 on the cap 2 and thus to readjust the ring until its openings match the cross bore of the bolt 1 after the nut 4 is screwed home again. It is evident that in most cases the cotter pin will then not enter into an accurately central position as shown, but rather assume a position within the apertures 6 anywhere between the two flaps 7 of the neck of the cap. On the other hand, if, on screwing home the nut 4 into its definite position of adjustment on the screw shank, the cross bore of the latter should be covered by the flaps of the neck, a different angular position for the cap on the nut is selected in which the cross bore again registers with the discontinued portions of the neck.

The locking device may be modified in various ways in respect of details of parts. Thus it is feasible for example to provide the ring on the cap with an inner nose for cooperation with a longitudinal groove of the shank of the bolt in order to secure the ring against distortion, so that the cotter pin can be dispensed with.

The second example as shown in the Figs. 6 to 9 provides a construction in which the ring enters into locking engagement with the screw shank directly, this construction thus being particularly simple and inexpensive.

In this construction the neck 7 of the cap 2 is provided with but one aperture for giving the arcuate member 3 access to the screw shank, the arcuate member being in the form of a split ring which in its initial condition is not closed (Fig. 7). The ring 3 is provided at one of its ends with an inwardly directed nose 5 for locking engagement with a depression 8 of the screw shank 1 in which way the ring 3 and the cap 2 together with it can be locked to the shank 1 of the bolt.

Also here, for producing a locking effect of the device, the cap 2 is slid appropriately on the tightened nut 4 together with the ring 3 in a disposition of the parts as shown in the Figs. 6 and 7. Thereupon the ring, which then can still be turned on the cap 2, is so adjusted that its nose 5 comes to lie opposite the aperture 8 provided in the screw shank 1 with the point of the nose slightly projecting into the aperture 8. Finally, in a similar manner as described in connection with the first example, the outer end of the neck 7 of the cap 2 is pressed onto the outer side of the springy ring 3 by hitting a die set on this end with a hammer. In this way the diameter of the open ring 3 is gradually reduced to the form of a closed ring until the initial condition of the device as shown in the Figs. 6 and 7 is changed to the locking condition thereof shown in the Figs. 8 and 9 wherein the ring 3 is closed and clamped on the cap 2, so that both parts 3 and 2 are locked to the screw shank 1, and the screw nut 4 is secured against working loose.

In order to unlock the device, the outer edge of the neck portion 7 is forced upwards in a similar manner as explained for the first example by means of an appropriate implement, whereupon the ring 3 opens again due to inherent spring action and thus the device is brought back into the condition as shown in the Figs. 6 and 7, so that the point of the nose of the ring 3 can be readily disengaged from the aperture 8 of the shank 1 of the bolt and the cap 2 removed.

The end portion of the arcuate member for locking with the shank of the screw need not necessarily be hook-shaped. This end portion may, for example, also be more or less straight for engagement into the circumference of the bolt by means of a depression extending transversely of the end portion and terminating in a substantially longitudinal groove providing an open entrance end (Figs. 10 and 11).

I do not limit myself to the particular size, shape, number or arrangement of parts as shown and described, all of which may be varied without going beyond the scope of my invention as shown, described and claimed.

What I claim is:

1. In a screw locking device, a screw threaded shank, a polygonal nut screwably adjusted into any angular disposition on said shank, a polygonal cap corresponding interiorly in shape and size with the external shape and size of the nut and pushable over the outer surface of said nut in different selective angular positions, a circumferentially discontinuous neck rigid with said cap, a connection member for said shank and said cap extending around said neck and annularly adjustable relative thereto, means for locking said connection member to said shank in registry with corresponding discontinued portions of said neck in one of said selective angular positions of said cap on said adjusted nut, and means for locking said connection member to said cap in any annularly adjusted position.

2. In a screw locking device, a screw threaded shank, a polygonal nut screwably adjusted into any angular disposition on said shank, a polygonal cap corresponding interiorly in shape and size with the exterior of the nut and pushable over the surface of said nut in different selective angular positions, a circumferentially discontinuous neck rigid with said cap, a ring-shaped connection member for said shank and said cap extending around said neck and annularly adjustable relative thereto, locking portions on said neck for locking said connection member, and a cotter pin for locking said ring to said shank by interengagement with both of these parts in registry with corresponding discontinued portions of said neck in one of said selective angular positions of said cap on said adjusted nut.

3. In a screw locking device, a screw threaded shank, a polygonal nut screwably adjusted into any angular disposition on said shank, a polygonal cap corresponding interiorly in shape and size with the exterior of said nut pushable over the surface of said nut in different selective angular positions, a circumferentially discontinuous neck rigid with said cap, a ring-shaped connection member for said shank and said cap extending around said neck and annularly adjustable relative thereto, locking portions on said neck for locking said ring, and a locking nose on said ring extending towards said shank for locking said ring to said shank by engagement into a substantially longitudinal groove of said shank in registry with corresponding discontinued portions of said neck in one of said selective angular positions of said cap on said adjusted nut.

4. In a screw locking device, a screw threaded shank having a locking depression, a polygonal nut screwably adjusted into any angular disposition on said shank, a polygonal cap corresponding interiorly in shape and size with the exterior of the nut pushable over the surface of said nut in different selective angular positions, a circumferentially discontinuous neck rigid with said cap, a split-ring connection member for said shank and said cap extending around said neck annularly adjustable relative thereto, locking portions on said neck for locking said split-ring thereto, and an inwardly directed terminal locking end on said split-ring for locking the latter to said shank by engagement into the said depression thereof in registry with corresponding discontinued portions of said neck in one of said selective angular positions of said cap on said adjusted nut.

5. In a screw locking device, a screw threaded shank, a polygonal nut screwably adjusted into any angular disposition on said shank, a cap corresponding interiorly in shape and size with the exterior of said nut pushable over the surface of said nut in different selective angular positions, a circumferentially discontinuous neck rigid with said cap, a split ring connection member for said shank and said cap pushed on said neck and extending around the same and annularly adjustable relative thereto, locking portions on said neck for said split ring, an inwardly directed terminal locking end on said split ring for locking the latter to said shank by engagement into the locking recess thereof in registry with corresponding discontinued portions of said neck in one of said selective angular positions of said cap on said adjusted nut, and an abutment face on the other end of said split ring for said locking end to bear against for securing said split ring in locking condition on said shank, while said locking portions of said neck engage with said split ring.

6. In a screw locking device, a screw threaded shank, a polygonal nut screwably adjusted into any angular disposition on said shank, a cap corresponding interiorly in shape and size with the exterior of said nut pushable over the surface of said nut in different selective angular spaced positions, a circumferentially discontinuous neck rigid with said cap, at least one springy split ring connection member for said shank and said cap having the tendency to expand and extending around said neck and annularly adjustable relative thereto, locking portions on said neck for said split ring, an inwardly directed terminal locking end on said split ring for locking the latter to said shank by engagement into a depression thereof in registry with corresponding discontinued portions of said neck in one of said selective angular by spaced positions of said cap on said adjusted nut, and an abutment face on the other end of said split ring for said locking end to bear against for securing said split ring in locking condition on said shank, while said locking portions on said neck engage with said split ring and contract the latter into bearing engagement between said locking end and said abutment face.

7. In a screw locking device, a screw threaded shank, a polygonal nut screwably adjusted into any angular disposition on said shank, a cap corresponding interiorly in shape and size with the exterior of said nut and pushable over the surface of said nut in different selective angular by spaced positions, a circumferentially discontinuous neck rigid with said cap, a split ring connection member for said shank and said cap extending around said neck and annularly adjustable relative thereto, locking portions on said neck for said split ring, and a locking nose on said split ring for locking the latter to said shank by engagement into the depression thereof in registry with corresponding discontinued portions of said neck in one of said selective angular by spaced positions of said cap on said adjusted nut, while said locking portions on said neck engage with said split ring.

8. A nut lock for locking an externally non-circular nut on a screw threaded shank having a locking recess, comprising a cap corresponding in internal shape and size with the external shape of said nut and adapted to fit over said nut, an annularly adjustable element on said cap having a connection portion adapted to be adjusted into alignment with the locking recess of said shank, means for locking said connection portion to said shank, and means for locking said connection element to said cap.

JEAN BILL.